United States Patent [19]

Hayes et al.

[11] 4,328,332

[45] May 4, 1982

[54] PROCESS FOR PRODUCING FLUORESCENT RESIN FOR INK JET PRINTERS

[75] Inventors: Larry J. Hayes, Roanoke; Keith L. Reddick, Dallas, both of Tex.

[73] Assignee: Recognition Equipment Inc., Irving, Tex.

[21] Appl. No.: 273,169

[22] Filed: Jun. 14, 1981

[51] Int. Cl.³ .............................................. C08G 63/12
[52] U.S. Cl. ..................................... 528/296; 528/281
[58] Field of Search ........................ 528/272, 281, 296

[56] References Cited

U.S. PATENT DOCUMENTS

| | | | |
|---|---|---|---|
| 3,053,783 | 11/1962 | Broadhead et al. | 260/29.2 |
| 3,068,206 | 12/1962 | Nicölson et al. | 528/296 |
| 3,499,058 | 3/1970 | Kaufman | 528/296 |
| 3,812,054 | 5/1974 | Noetzel et al. | 528/296 |
| 4,024,111 | 5/1977 | Thomas et al. | 260/75 T |
| 4,136,089 | 1/1979 | Bier et al. | 260/45.75 C |

OTHER PUBLICATIONS

Hill and Walker, (J. of Polym. Sci.), 3 (5), 609 (1948).
Bruce, (IBM J. Res. Develop.), May 1976, p. 258.
Rubin and Whatshavsky, (Israel J. of Tech.), 8 (4), 285 (1970).

*Primary Examiner*—Lucille M. Phynes
*Attorney, Agent, or Firm*—John E. Vandigriff

[57] ABSTRACT

A fluorescent resin useful in water based ink jet printing based upon both molecular weight and degree of cross-linking of the resin during the manufacture is made utilizing trimellitic anhydrides, propylene glycol, neopentyl glycol, or both, and zinc acetate.

8 Claims, No Drawings

PROCESS FOR PRODUCING FLUORESCENT RESIN FOR INK JET PRINTERS

FIELD OF INVENTION

This invention relates to water based ink jet printing inks and more particularly to fluorescent resins used in making such ink.

BACKGROUND OF THE INVENTION

Fluorescent resins that are useful in water based ink jet printing inks are based on both molecular weight and degree of crosslinking of the resin during manufacturing. If the molecular weight is not controlled within defined limits, then the viscosity of the resulting jet ink may be too high to be useful, e.g., greater than 10 cps. It is known that the amount of resin in the jet ink also controls the viscosity of the jet ink. However, in the case of fluorescent jet inks, there are two additional parameters to consider. First, the amount of fluorescent dye in the resin determines the degree of fluorescence that the jet ink will exhibit. At low dye concentration, there is minimal fluorescence. As the dye concentration increases, so does the fluorescent brightness of the jet ink until the dye concentration reaches a point that the dye becomes "self-quenching". That is, the dye molecules become too close together and thus absorb the fluorescent light prior to it escaping from the resin.

Therefore, fluorescent jet inks must balance the amount of fluorescent dye in the resin to achieve maximum fluorescence and the amount of resin in the ink to control both jet ink viscosity and fluorescence. It is known that a viscosity between 1 cps and 10 cps is desired for jet inks.

Thus, the concentration of fluorescent resin that can be used is related to the molecular weight of the resin. The larger the molecule, less resin can be employed in order to maintain low viscosity, and thus lower fluorescence is obtained.

Additionally, resins for jet inks must be totally soluble in the ink formulation. Particle sizes in excess of one micron will cause clogging of a typical jet nozzle. Solubility of the fluorescent resin in a water based jet ink is dependent on the chemical structure of the resin, molecular weight, and degree of crosslinking.

Hill and Walker (J of Polym Sci, 3 (5), 609 (1948)) describe the effect of molecular weight on the properties of polyester resins. Their conclusions were that the chemical structure of the polyester correlates to the solubility of the resin. Bruce (IBM J. Res. Develop., May 1976, p. 258) reported that the jet inks containing polymers exhibited longer separation lengths than non-polymeric jet inks and that the theoretical model for jet inks showed a dependency on polymer concentration. Bruce also states that the viscous "power law" fluid model was inadequate to explain the behavior of the polymeric jet inks. Rubin and Whatshavsky (Israel J. of Tech, 8 (4), 285 (1970)) also show that polymeric jet inks behave in an unpredictable manner.

Broadhead (U.S. Pat. No. 3,053,783) shows that trimellitic anhydride, when reacted with an aliphatic polyol, produces a water soluble resin. Broadhead claims essentially all alkylene glycols, or all alkylene ether glycols, will yield water soluble resins. Thomas, et. al. (U.S. Pat. No. 4,024,111) discuss the use of trimellitic anhydride to produce highly branched polyesters. Crosslinking of polymer chains is known to cause insolubility of the resin. In fact, the amount of insolubility of the resin relates to the degree of crosslinking present in resins.

SUMMARY OF THE INVENTION

The present invention describes a method to produce a fluorescent resin usable for jet inks. The invention takes into consideration the chemical structure of the resin, molecular weight of the product, controlling the amount of crosslinking during reaction, and the water solubility of the product. When trimellitic anhydride and ethylene glycol in a molar ratio of 1:1, and zinc acetate were heated to 215° C., within an hour a product with limited solubility in ammonia was obtained. When trimellitic anhydride, isophthalic acid and ethylene glycol in a molar ratio of 1:1.1:0.6, and zinc acetate were reacted for 1.5 hours and a maximum temperature of 180° C., the product showed no solubility in ammonia.

These two examples show that the desired resin is not merely a product of trimellitic anhydride and a glycol, but that the process for preparing a suitable resin is important. Zinc acetate was the catalyst for the reactions.

Trimellitic anhydride and propylene glycol (1.2-propanediol) in a molar ratio of 1:1.2, and zinc acetate were combined and reacted for two hours and a maximum temperature of 210° C. with no holding period at 150° C. The product would not dissolve in ammonia. When dibutyltin oxide was used instead of zinc acetate as the catalyst under the same reaction conditions that provided an acceptable resin using zinc acetate, a product not totally soluble in ammonia was obtained. Again, this reaction shows the desired product is a function of reaction conditions as well as components of reactions.

EXAMPLES OF THE INVENTION

The following examples show the process necessary to produce a polyester resin from trimellitic anhydride, propylene glycol, neopentyl glycol, or a mixture of the two glycols, and zinc acetate. Approximately 1 pound of water for each 28 pounds of reactants is liberated during the process. A molar ratio of 1:1 TMA to glycol to 1:1.15 TMA to glycol is used.

EXAMPLE 1

| Ingredients | Weight in Grams | Moles |
| --- | --- | --- |
| Trimellitic Anhydride | 600.0 | 3.1 |
| Propylene Glycol | 274.0 | 3.6 |
| Zinc Acetate | 0.4 | 0.003 |

Blend trimellitic anhydride, propylene glycol and zinc acetate into a resin kettle with constant agitation using a shear mixing blade. As the components are mixing, raise the kettle temperature until the reactants achieve a temperature of 150°±5° C. Hold the kettle temperature at 150°±5° C. for at least 30 minutes to permit melting and homogeneous solution of the components.

After a homogeneous melt has been achieved, raise the kettle temperature so that the melt can increase in temperature to 180°±3° C. This increase should occur as rapidly as is possible. At temperatures above 160° C., distillation of water should occur. Continue heating until 35 mls of distillate have been collected. Discontinue heating and remove the resin melt from the kettle as quickly as possible. The product was allowed to cool to room temperature. The product has an acid number of 240–280.

EXAMPLE 2

| Ingredients | Weight in Grams | Moles |
|---|---|---|
| Trimellitic Anhydride | 600.0 | 3.1 |
| Neopentyl Glycol | 376.0 | 3.6 |
| Zinc Acetate | 0.4 | 0.003 |

Blend trimellitic anhydride, neopentyl glycol (2,2-dimethyl-1,3-propanediol), and zinc acetate into a resin kettle with constant agitation using a shear mixing blade. As the components are mixing, raise the kettle temperature until the reactants achieve a temperature of 150°±5° C. for at least 30 minutes to permit melting and homogeneous blending of the components.

After a homogeneous melt has been achieved, raise the kettle temperature so that the melt can increase in temperature to 180°±3° C. This increase should occur as rapidly as possible. At temperatures above 160° C., distillation of water should occur. Continue heating until 35 mls of distillate have been collected. Discontinue heating and remove the resin melt from the kettle as quickly as possible. Allow the product to cool to room temperature. The product has an acid number of 220–240.

EXAMPLE 3

| Ingredients | Weight in Grams | Moles |
|---|---|---|
| Trimellitic Anhydride | 600.0 | 3.1 |
| Propylene Glycol | 139.0 | 1.8 |
| Neopentyl Glycol | 188.0 | 1.8 |
| Zinc Acetate | 0.4 | 0.003 |

Blend trimellitic anhydride, propylene glycol, neopentyl glycol, and zinc acetate into a resin kettle with constant agitation using a shear mixing blade. As the components are mixing, raise the kettle temperature until the reactants achieve a temperature of 150°±5° C. Hold the kettle temperature at 150°±5° C. for at least 30 minutes to permit melting and homogeneous solution of the components.

After a homogeneous melt has been achieved, raise the kettle temperature so that the melt can increase in temperature to 180°±5° C. This increase should occur as rapidly as possible. At temperatures above 160° C., distillation of water should occur. Continue heating until 35 mls of distillate have been collected. Discontinue heating and remove the resin melt from the kettle as quickly as possible. Allow the product to cool to room temperature. The product has an acid number of 250–270.

Other examples may become apparent to those skilled in the art which examples may fall within the scope of the following claims.

What is claimed is:

1. A process for making a polyester resin comprising the steps of: blending a mixture of trimellitic anhydride, a glycol chosen from either 1,3-propanediol or 2,2-dimethyl-1,3-propanediol or a mixture thereof and zinc acetate in a resin kettle, while blending the mixture raise the kettle temperature to about 150° C., maintain the kettle temperature for at least 30 minutes to permit melting and formation of a homogeneous mixture, increase the kettle temperature to about 180° C. and maintain the temperature until distillation of the water amounts to 0.03 to 0.04 of the charge and then immediately remove mixture and cool to room temperature.

2. The process according to claim 1 wherein the glycol is 1,3-propanediol.

3. The process according to claim 1 wherein the glycol is 2,2-dimethyl-1,3-propanediol.

4. The process according to claim 1 wherein a shearing blade is used in blending the mixture.

5. The process according to claim 1 wherein the glycol is a mixture of 1,3-propanediol and 2,2-dimethyl-1,3-propanediol.

6. The resin according to claim 1 wherein the resin has an acid number of 100 to 350.

7. The resin according to claim 1 wherein the resin has a molecular weight of 500 to 5000.

8. The process according to claim 1 wherein the trimellitic anhydride to glycol ratio is 1:1 to 1:1.5.

* * * * *